US008316434B2

(12) United States Patent
Muhamed et al.

(10) Patent No.: US 8,316,434 B2
(45) Date of Patent: Nov. 20, 2012

(54) CENTRALIZED ACCESS CONTROL SYSTEM AND METHODS FOR DISTRIBUTED BROADBAND ACCESS POINTS

(75) Inventors: Rias Muhamed, Austin, TX (US); Anil Kumar Doradla, Austin, TX (US); David Randall Wolter, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1156 days.

(21) Appl. No.: 11/064,418

(22) Filed: Feb. 23, 2005

(65) Prior Publication Data

US 2006/0191005 A1  Aug. 24, 2006

(51) Int. Cl.
*G06F 15/16* (2006.01)
(52) U.S. Cl. ............... 726/15; 726/2; 726/5; 726/24; 713/153
(58) Field of Classification Search ............... 726/15
See application file for complete search history.

(56) References Cited

U.S. PATENT DOCUMENTS

| | | | |
|---|---|---|---|
| 6,263,369 B1 * | 7/2001 | Sitaraman et al. | 709/225 |
| 6,301,665 B1 * | 10/2001 | Simonich et al. | 726/2 |
| 6,453,461 B1 * | 9/2002 | Chaiken | 717/124 |
| 6,636,894 B1 * | 10/2003 | Short et al. | 709/225 |
| 7,099,957 B2 * | 8/2006 | Cheline et al. | 709/245 |
| 7,298,702 B1 * | 11/2007 | Jones et al. | 370/235 |
| 7,389,534 B1 * | 6/2008 | He | 726/15 |
| 7,633,909 B1 * | 12/2009 | Jones et al. | 370/338 |
| 7,725,128 B2 * | 5/2010 | Marsh et al. | 455/556.1 |
| 2004/0047320 A1 * | 3/2004 | Eglin | 370/338 |
| 2004/0148430 A1 * | 7/2004 | Narayanan | 709/238 |
| 2004/0174900 A1 * | 9/2004 | Volpi et al. | 370/466 |
| 2004/0203752 A1 * | 10/2004 | Wojaczynski et al. | 455/432.1 |
| 2004/0255167 A1 * | 12/2004 | Knight | 713/201 |
| 2006/0089121 A1 * | 4/2006 | Elgebaly et al. | 455/410 |
| 2006/0191005 A1 * | 8/2006 | Muhamed et al. | 726/15 |

* cited by examiner

*Primary Examiner* — Kambiz Zand
*Assistant Examiner* — Yonas Bayou
(74) *Attorney, Agent, or Firm* — Toler Law Group, PC

(57) ABSTRACT

In accordance with the teachings herein, a wireless access point module having a plug and play feature and an auto-configuration engine may be used to provide substantial benefits to business owners, Internet service providers, and subscribers. The wireless access point module may have memory and a processor configured such that during "power-up" the processor reads instruction from memory and automatically creates a virtual private network (VPN) with a centralized access gateway via a network VPN server. In turn, the wireless access point module may utilize this VPN for subscriber communications.

21 Claims, 2 Drawing Sheets

CENTRALIZED ACCESS CONTROL SYSTEM AND METHODS FOR DISTRIBUTED BROADBAND ACCESS POINTS

FIELD OF THE DISCLOSURE

The present disclosure relates generally to accessing network assets and more particularly to centralized access control systems and methods for distributed broadband access points.

BACKGROUND

The number of public locations such as airports and coffee shops that provide Internet access continues to grow. These public access locations are commonly referred to as "venues," "hotspots," and/or broadly as "access points." Wireless hotspots can be a place where patrons, while visiting an establishment, are permitted to interface with and utilize a computer connected to the Internet via wireless technology, and may consist of multiple wireless elements known as access points.

Deployed hotspots often include a special switch that validates a requesting user's right to utilize the hotspot and to access the Internet via its associated network. In some cases, the switch may be relatively feature-rich and support several functions. In other cases, the switch may simply block a user's traffic until the user's right to use the hotspot and network is validated. However implemented, including a switch at a hotspot location increases costs. Switches generally can be referred to as access control gateways (ACG). Providers have attempted to reduce these switch-related costs by providing an ACG that has a reduced purchase price, but these lower cost ACGs tend to have reduced functionality and reliability and increased set-up and maintenance costs.

It would be desirable to keep the implementation and maintenance cost of hotspots minimized without limiting the features and functionality of the hotspot. Accordingly, what is needed is a cost effective solution that facilitates rapid and broad deployment of broadband wireless public access, but does not compromise functionality, manageability, scalability, and security of the network.

BRIEF DESCRIPTION OF THE DRAWINGS

It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

A hotspot consisting of a wireless access point module having plug and play functionality may provide substantial benefits to business owners, Internet service providers, and subscribers. In accordance with teachings disclosed herein, a wireless access point module may be deployed with a memory and a processor configured such that during "power-up" the processor reads instruction from memory and automatically creates a virtual private network (VPN) tunnel or connection to a centralized access gateway. In practice, the wireless access point module may subsequently utilize the VPN connection for at least some subscriber and/or subscriber-related communications. When subscribers connect to the wireless access point, a remote authorization authentication and accounting (AAA) module associated with a centralized gateway may be utilized to authorize the subscribers. Traffic associated with this authentication process may travel via the VPN connection. Moreover, subscribers may be allowed to utilize the established VPN to subsequently access the Internet. For example, an authorized subscriber may be granted unlimited Internet access via the virtual private network connection.

A centralized access control gateway incorporating teachings disclosed herein may be configured to receive authorization requests originating from a user's local area wireless device through a VPN tunnel established between a wireless access point tunneling client and a tunneling server.

As indicated above, a wireless access point module (WAPM) may be placed at a public place such as a café and may allow subscribers to enjoy a mobile office where they can exchange information with sources around the world. To reduce the cost and complexity of deploying a given WAPM, the access point module described herein may utilize a centralized access control gateway (ACG) for providing services like authorization. In practice, an ACG may help create and/or support a restricted or "private" communication link and seamlessly connect to a plurality of distributed WAPMs. When a WAPM requires updates or changes, the maintenance may also be accomplished with the help of an ACG at a central location reducing the need to individually visit and upgrade each venue. Network management as a result may become less costly, potentially more profitable, and manageable.

A central ACG-remote WAPM architecture may also help expand network deployment to underserved areas. For example, such an architecture may improve the attractiveness of deploying access points at small venues such as restaurants and coffee shops where the coverage footprint and traffic density is relatively low (i.e. there is a small number of users).

Figure 1:
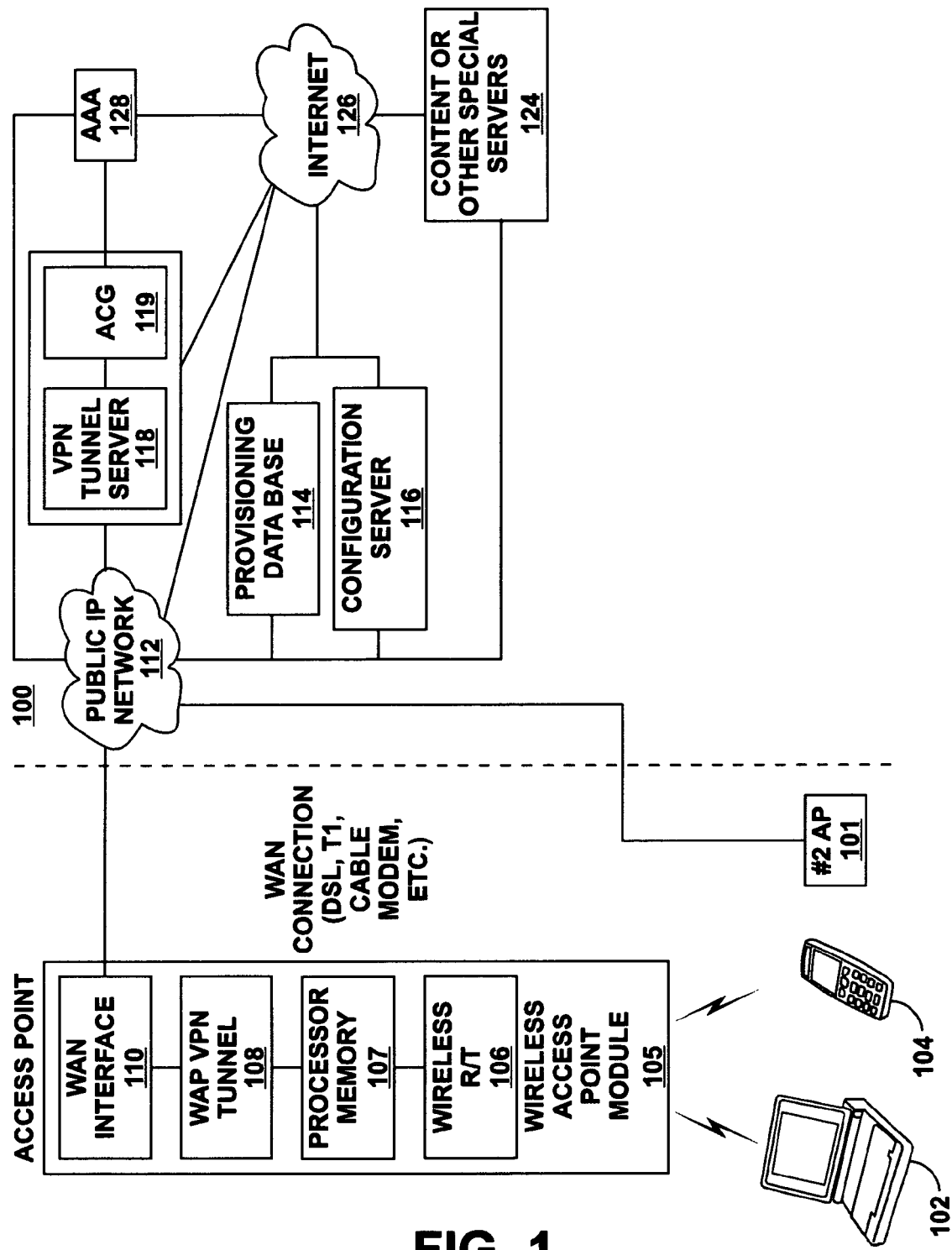
FIG. 1 presents a simplified configuration of a centralized access control for a plurality of distributed access points that incorporates teachings of the present disclosure.

The illustrative system of FIG. 1 provides a low cost, plug and play remote wireless access point module for facilitating subscriber communications with a communications network such as the Internet 126. System 100 includes a first subscriber 102 and a second subscriber 104 having access to Internet 126 via a wireless access point module (WAPM) 105. The system can include a plurality of access points as is illustrated by WAPM 105 and second access point module 101. An access point can provide features similar to that of a "wireless hub" and the access point can be configured to support a local area network (LAN). As depicted, WAPM 105 can include a memory/processor combination 107. The memory may store instructions, and the processor may execute those instructions.

WAPM may also include a wireless receiver-transmitter 106, a virtual private network (VPN) tunnel engine 108, and a wide area network (WAN) interface 110. In hard-wired configurations, wireless receiver-transmitter 106 could be replaced with a standard hardwired Ethernet card. And, depending on design concerns, WAN interface 110 could include a modem, a router, and/or a switch such as an Ethernet switch or any other device that can interface and/or transmit data from premises having an access point to a public communications network and/or a managed IP network like network 112.

As shown, WAPM 105 may be connected to an IP network 112 utilizing many different connection modalities such as a digital subscriber line (DSL), a T1 line, an antenna, a coaxial cable, a fiber optic cable, etc. IP network 112 may be configured to transmit and receive data utilizing an Internet protocol or any other protocol that supports networked devices. Although network 112 is illustrated separately from Public Internet 126, the line delineating the two networks may be blurred in various implementations. Internet 126 and/or network 112 may be communicatively coupled to provisioning database 114, configuration server 116, and network VPN tunnel server 118, and access control gateway (ACG) 119. An authentication authorization and accounting (AAA) module 128 may also be coupled to ACG 119 for authorizing users of the network. Content or other special services server 124 may also be communicatively coupled to the WAPM 105. The content or special services server 124 may, for example, supply restricted access for information or services over the Internet 126. For example, a special services server 124 may provide access to a website for downloading music or videos requiring a subscriber to pay a subscriber fee.

The access point can utilize many different formats to communicate with subscribers 102 and 104. One such form includes a wireless communication standard such as WiFi, and WiMax; however any wireless technology such as infrared or spread spectrum technology and secure protocols could be utilized with the illustrated configuration. Alternately, a hardwired plug and play access point could be utilized without parting from the spirit and scope of the present teaching.

In practice, first subscriber 102 could utilize a laptop computer having a wireless card, and second subscriber 104 could utilize a handheld computer such as a personal digital assistant, or a mobile telephone to communicate with the wireless receiver-transmitter 106. Two wireless subscribers and two types of subscriber devices are illustrated, however hundreds of thousands of wireless subscribers utilizing hundreds of different types of subscriber devices could be supported by the described system. In one configuration multiple access points at a given venue, particularly a big venue such as a football stadium or an airport can be connected to each other utilizing a larger LAN or an Ethernet system having hubs and routers. The Ethernet hub can then provide broadband interconnectivity to the Internet 126.

Depending upon implementation detail, a system incorporating teachings of the present disclosure may be described in four parts, (1) a network architecture that provides a centralized access control gateway for a plurality of access points; (2) an integrated WAPM capable of linking to an ACG; (3) an auto-configured VPN tunnel engine for helping to authenticate subscribers from a broadband access point; and (4) subscriber management.

Centralized Access Control Gateway

A network architecture associated with a centralized gateway approach is illustrated in FIG. 1. Distributed access points can be located hundreds of miles away from a designated ACG. Depending upon design considerations, the WAN node connecting the centralized ACG like ACG 119 may be placed at an ISP Point of Presence, a Data Center, a central office, a remote terminal or a broadband remote access server location or proximate to a main communication trunk. The centrally located ACG may provide for efficient maintenance, troubleshooting, diagnosis, and upgrading when operational inefficiencies cause problems for the subscribers, the access point owner, the communication provider, and/or the ISP.

Additionally, complex functions and services can be efficiently added at the central location to provide a highly scaleable implementation. For example, an ACG like ACG 119 may be more prone to fail, become outdated, or reach maximum user capacity. The costs related to determining the problem and solving the problem possibly by adding equipment is greatly reduced with the centralized system described herein. Moreover, a given network provider like an ISP, often has skilled technicians onsite at central locations where the centralized ACG can be easily monitored and protected. For example, when new software versions are available for viruses and the like, changes can be implemented at the central ACG 119 without having to send a technician to dozens of venues miles away to maintain each access point.

It may also be advantageous to centrally locate a VPN tunnel server 118 and AAA module 128. This allows for more efficient communication between ACG 119, VPN servers 112 and AAA module 128. Further, tunnel server 118, ACG 119 and AAA module 128 can be maintained, serviced, and/or upgraded much more easily because of their convenient location. The number of access points that can be serviced by and communicate with a single ACG 119 can be determined by the capabilities and performance requirements of the access points 101, 105, the capacity of the ACG 119, and parameters of a transport network, which may include elements of network 112 and/or 126. As compared to a simple WiFi hub, an ACG may be relatively expensive to purchase, install, and maintain. By implementing a centralized ACG 119, it may be possible to amortize the cost of the network access functionality across several access points. A centralized ACG may be able to service hundreds of access points and thus, the processing resources of a single ACG 119 may be shared by several access points. In FIG. 1, only two access points 105 and 101 are illustrated for simplicity, however it may be possible to serve hundreds of access points with a single ACG 119.

An Integrated WAPM Linking to an ACG

The disclosed centralized configuration provides greater efficiency and economy particularly if the WAPM has integrated elements and utilizes a plug and play or auto-provisioning configuration to form a link with an AGC. In several implementations, a subscriber may not be allowed to completely utilize the capabilities provided by an access point until the WAPM can establish and/or confirm the subscriber's right to use the WAPM. Initial communications between a user device and a WAPM may involve standards-based communications associated with link establishment, ID assignment, etc. After some initial configurations, a virtual private network (VPN) link may be utilized to perform functions like those associated with an AAA server. To facilitate this aspect of the teachings, a WAPM may include an auto-VPN establishment feature, which will be described in more detail in the section below.

WAPM 105 may be relatively simple and include a processor 107 with memory, a wireless receiver transmitter 106, a modem or router creating a broadband WAN interface 110 (e.g. a conduit to interface a communication line such as a DSL line or a coaxial cable, or a T1 line interface) and a VPN tunneling mechanism 108. All of these elements may be housed, for example, in a single enclosure. [0]However, this is not required as the elements may be separate without affecting the system operation. In one configuration, the components can be integrated on a single circuit board. Essentially, WAPM 105 may convert a standard broadband access connection (e.g. a phone line) at a given venue into a secure multi-user, wireless broadband public Internet access point. This access point may also be capable of establishing a "tunneled" connection with a central ACG.

An auto-configuration/handshake process conducted by WAPM 105 can facilitate "self-installing" a network security system at the public access point. A secure WAN connection from an access point via an auto-configuration WAPM 105 may be accomplished utilizing different methods. For example, WAPM 105 may at power-up broadcast a request over network 112 and/or Public Internet 126, and configuration server 116 can act as a "link detector." Thus, configuration server 116 may determine that a WAPM is connected and ready to communicate. Configuration server 116 could store the identity of WAPM 105, determine an appropriate response, and respond to the initial WAPM 105 transmission. Configuration server 116 may then initiate a software download to the WAPM as part of a handshake/auto-configuration process. The software provided to WAPM 105 may be tailored to WAPM 105 and allow WAPM to establish a VPN tunnel to server 118.

In another implementation, WAPM 105 may send a message to a known configuration server 116 based on pre-programmed instructions. The message may represent a request from WAPM 105 to be "turned on" or to be brought into a VPN relationship with a centralized ACG. The message may be sent automatically at power-up and may include identifying information such as a media access control (MAC) number, an Internet Protocol (IP) address and/or any identifier for WAPM 105. In practice, the turn-on message may be sent from WAPM 105 to a predetermined configuration server loaded in WAPM's memory 107 prior to shipment of the WAPM 105 to a customer. With this approach, configuration server 116 may be directly prompted by the requesting WAPM over the Internet or the public IP network 112.

In yet another implementation, provisioning database 114 can store a look up table that maps each WAPM to a given ACG. WAPM 105 and/or configuration server 116 could, for example, access provisioning database 114 to determine a pre-assigned WAPM-ACG configuration. Similarly, a specialized "start-up" ACG may be provided and configured to initiate set-ups or provision for WAPMs that are new to a network. Thereafter, a WAPM-ACG assignment may be modified to create an optimum or desired configuration. To improve system performance, proximity, traffic density and capacity may be utilized to determine an appropriate WAPM-ACG interconnect configuration.

As indicated above, an initial WAPM 105 communication can be sent at power up. Whenever sent, a communication from WAPM 105 may be sent utilizing a simple network management protocol (SNMP) or other IP based message along with the unique identifier of the WAPM 105. In a large-scale deployment, there may be several WAPMs and several ACGs distributed throughout a service provider's network. To help identify and track the appropriate ACG for a given venue or WAPM, a database, possibly contained in the centralized provisioning database 114 can map each WAPM 105 to a particular ACG. An access point and an ACG may be identified and linked in the database by an identifier such as a media access control (MAC) address, a serial number, an Internet protocol (IP) address, a domain name, a programmed number, a physical address, a geographical location, or a phone line identifier (Caller ID). Some other electronic identifier may be utilized without parting from the scope and spirit of the teachings herein.

In yet another implementation, a WAPM may request configuration instructions during a dynamic host configuration information protocol (DHCP) negotiation process (e.g. option 66 and 67 of the DHCP protocol). During such an auto-configuration process, configuration server 116 may custom configure each WAPM by downloading software contained, for example, in provisioning database 114.

If a venue has DSL authentication provisions, WAPM 105 may store and utilize a predefined start-up configuration that utilizes known DSL WAN transport provisions. Software instructions may be loaded in to memory of the ACG or the WAPM 105 such that the processor in the WAPM 105 can auto-configure and begin a communications session (get authorized and join the communication network as an active device). This plug and play feature may also provide the ability of WAPM 105 to automatically configure its operational parameters such as the IP address, protocols, communication speed etc. and automatically transmit and receive data. In practice, the WAPM may be designed to reconfigure its operational parameters at any time based on instruction received from a centralized configuration server. WAPM 105 may also be designed so that every time it is connected or "plugged in" to a broadband connection it transmits a request and its network presence is detected and it receives configuration instruction.

Other network devices such as AAA module 128, configuration server 116, and provisioning database 114 may be included in this network device assignment handshake. In one illustrative embodiment, provisioning database 114 can collect and store network assignments and parameters such as network device identifiers (i.e. IP addresses), device-to-device assignments, and VPN configurations. Additionally, centrally located provisioning database 114 could also store network auto-configuration data such as, how to configure an individual WAPM, what capabilities a given WAPM has, what version of software a given WAPM has, the number of subscribers supported by the WAPM, the closest and most efficient network connection for the WAPM, the ACG assigned to the WAPM 105, subscriber plans, other information, and/or some combination thereof.

Auto Configured VPN Tunnel

After initial "handshaking" and WAPM-ACG matching, a virtual private network (VPN) may be established between a WAPM and an ACG. Generally, a VPN is a communication channel created between two devices over a public network, wherein the communication channel is "point to point" and confines data transmissions within the established channel. A VPN establishes a "tunnel" such that the data transmissions are bundled or encapsulated in another format to keep the data within the established channel. Thus, address and routing requests that are encapsulated will not control the networking process. A VPN offering can help assure that subscribers accessing a WAPM will communicate through the selected ACG.

Depending upon implementation detail, when a newly installed WAPM seeks auto-setup for broadband access, configuration server 116 may require the WAPM to create a VPN with the ACG. The instruction needed by a WAPM, for example WAPM 105, to establish a VPN may be pre-stored and/or downloaded to the WAPM during the WAPM-ACG handshake process via provisioning database 119. Likewise, the target ACG may receive tunneling instruction from provisioning database 114.

In one configuration, the VPN tunnel may be created by WAPM VPN tunnel engine 108 initiating a session with the network VPN tunnel server 118. The VPN systems can use encryption and other security mechanisms to ensure that an unauthorized user can only access a specific location such as the ACG 116 or the AAA module 128. Tunneling parameters may be stored in, and retrieved from the provisioning database 114. In one implementation, configuration server 116 may act as a mediator and transmit the VPN parameters to the WAPM and the ACG. Depending upon designer concerns, a single tunnel may be established and may be utilized by all subscribers connected to a given WAPM like WAPM 105. However, each subscriber device may establish its own VPN with an ACG.

In an illustrative embodiment, after a VPN tunnel is established, the subscriber may be required to communicate through the ACG. For example, WAPM 105 and/or ACG 119 may block all unauthorized users from gaining connectivity to the general Internet or other private servers connected behind it by requiring all WAPM 105 connected devices to communicate over the VPN. A hardware mechanism or process may be built into WAPM 105 that ensures that WAPM traffic (subscriber traffic) is carried to central ACG 119. Similarly, VPN tunneling instructions may be stored in the WAPM memory prior to shipment to the venue to facilitate similar traffic routing patterns.

Tunneling may be achieved in any number of ways. For example, a VPN client may support a protocol like IPSec, IP in IP, GRE, and/or L2TP. On the network side, VPN tunnel server 118 capabilities could be built-into the same box as ACG 119. The capabilities could also be implemented on a separate platform connected to central ACG 119 such as at VPN tunnel server 118.

Subscriber Management

Subscribers can purchase many different Internet access plans or subscriptions. The subscriptions can be purchased from the owners of the access points, communications providers, an ISP, and/or some other entity. In one configuration, an ISP can determine what plans will be available at each access point. To help facilitate this type of offering, WAPM 105, ACG 119, AAA module 128 and/or provisioning database 114 may store subscription plan (e.g. rate for services, speed of the connection, access, etc.) that is specific to an access point or specific to a subscriber. Once a particular venue/access point is provisioned each customer, or group of customers, may be given special treatment by network components like WAPM 105 based on the subscription plan that they have purchased.

Subscription plans may be simple or complex depending on the type of services provided. In simple cases, every user may have and pay for a standard monthly Internet service. In more complex service plans, such as time-based plans or per user sessions plans, subscriber access must be authorized, monitored, and billed. In performance-based plans, increased speeds, bandwidth, and complex privacy features may be available and controlled by ACG 119. ACG 119 may also facilitate subscriber plans by accessing data in central (AAA) system 128. In accordance with the teachings herein, communication system 110 can restrict WAPM 105 and subscriber communications to a single centralized ACG 119. A VPN can be the conduit to restrict WAPM 105 based communications to a single authorization device. As part of the auto-provisioning a virtual privacy network (VPN) method or configuration can be utilized to funnel subscriber traffic to a predetermined location until a subscriber is identified and authorized by AAA module 128.

Figure 2:
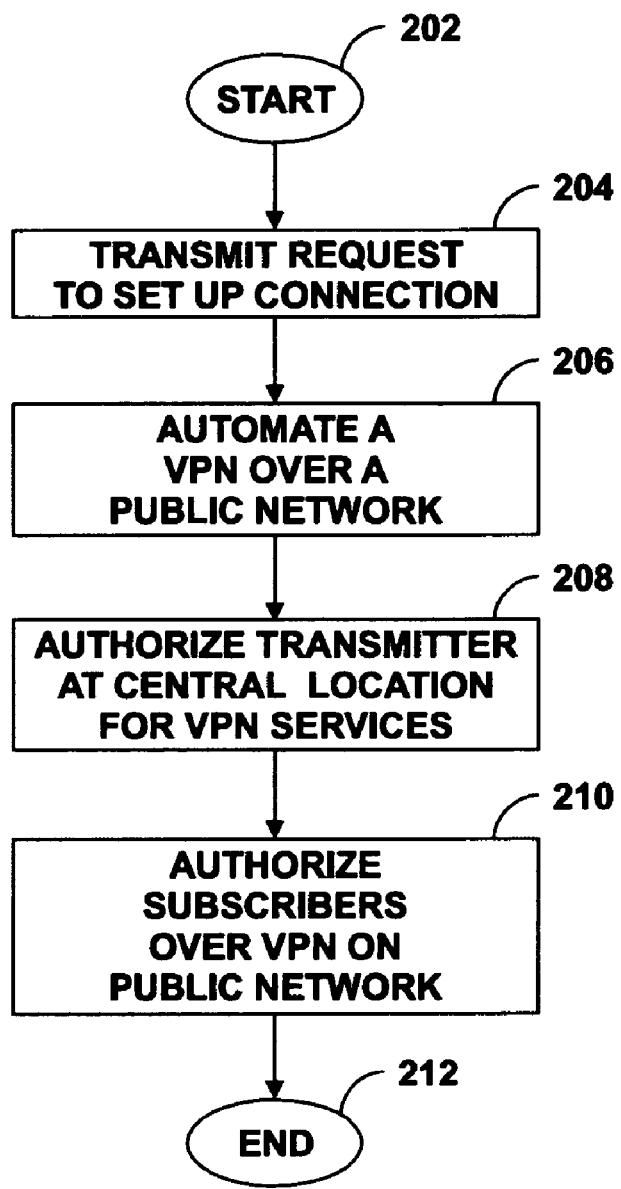
FIG. 2 illustrates a flow diagram of a method of providing centralized access for a plurality of plug and play access points that incorporates teachings of the present disclosure.

Referring to FIG. 2, a flowchart illustrating a method for providing and securing an auto configuration process is disclosed. The method starts at step 202 and proceeds to step 204 where an access point module that is connected to a network transmits a request for connection. The transmission could be a request for the creation of a WAPM-ACG association. In one case, the request for connection may include an access point identifier to indicate a network device presence. After a given network device establishes a relationship/connection, a VPN connection can be configured over a network at step 206. Utilizing the VPN, the transmitter of the connection request may be authorized at a central location as illustrated in step 208. When subscribers connect to an established WAPM, one that has created a tunnel, the tunnel may be utilized to authorize the subscribers as illustrated by step 210. Once the subscriber is authorized, the subscriber may be granted the ability to communicate with other devices on the network, however structured, the process may end at step 212.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A communication system, comprising:
an access point configured to receive wireless data via a local area wireless network from a plurality of wireless devices, wherein the access point includes a virtual private network tunneling client and pre-programmed plug and play connection configuration instructions stored at a memory of the access point, wherein the access point comprises a processor to execute the pre-programmed plug and play connection configuration instructions at power-up of the access point to enable the virtual private network tunneling client to:
automatically send a request to a configuration server, wherein the request includes an identification of the access point;
receive virtual private network tunnel parameters from the configuration server; and
establish, via a wide area network interface, a virtual private network tunnel between the access point and a centralized access control gateway based on the virtual private network tunnel parameters received from the configuration server to provide access to destinations outside of the local area wireless network for the plurality of wireless devices.

2. The communication system of claim 1, further comprising a centralized authentication, authorization and accounting module communicatively coupled to the centralized access control gateway, wherein the centralized authentication, authorization and accounting module is configured to authenticate at least one of the plurality of wireless devices.

3. The communication system of claim 1, wherein the configuration server accesses a database to determine the centralized access control gateway based on the identification of the access point.

4. The communication system of claim 1, wherein the processor executes the pre-programmed plug and play connection configuration instructions at power-up to enable the virtual private network tunneling client to receive software downloaded from the configuration server and wherein the software is executable by the processor to establish the virtual private network tunnel to the centralized access control gateway.

5. The communication system of claim 1, wherein the centralized access control gateway is determined based on the identification of the access point in the request, and wherein the configuration server sends the virtual private network tunnel parameters to the access point and to the centralized access control gateway.

6. An access point comprising:
a local area network wireless interface configured to receive a client transmission from a wireless-enabled device;
a wide area network interface communicatively coupled to the local area wireless interface and configured to output the client transmission to a wide area network;
an auto-configuration engine configured to send a configuration request to a configuration server during a power-up procedure of the access point, wherein a response received by the access point in response to the configuration request includes an identifier of a tunneling server associated with a centralized access control gateway; and
a virtual private network tunneling engine configured to use the identifier received from the configuration server to automatically communicate with the tunneling server to establish a virtual private network tunnel from the access point to the centralized access control gateway during the power-up procedure, wherein the virtual private network tunnel at least partially interconnects the wide area network interface and the centralized access control gateway using pre-programmed plug and play connection configuration instructions, and wherein the virtual private network tunnel is configured to carry communications to and from the wireless-enabled device and one or more other devices coupled to the access point.

7. The access point of claim 6, wherein the centralized access control gateway is configured to receive communications from a plurality of devices, and wherein virtual private network tunnels are established between each of the devices and the centralized access control gateway.

8. The access point of claim 6, further comprising an authorization module coupled to the wide area network interface and configured to send communications from the wide area network interface to the centralized access control gateway until a client of the client transmission is authorized by the authorization module.

9. The access point of claim 6, wherein the centralized access control gateway and the access point are associated with a service provider.

10. The access point of claim 6, wherein the virtual private network tunnel is established utilizing one of an IPSec, IP in IP, GRE and L2TP protocol.

11. The access point of claim 6, wherein the wireless interface utilizes one of a WiFi and a WiMax protocol.

12. The access point of claim 6, further comprising memory for storing an address of the centralized access control gateway.

13. The access point of claim 6, wherein the centralized access control gateway is located at one of an internet service provider point of presence, a central office, a remote terminal, a broadband remote access location, and a data center.

14. The access point of claim 6, wherein the configuration server communicates with a provisioning database to determine the response.

15. A method of providing distributed network access at a wireless access point, the method comprising:
automatically sending a request to a configuration server during a power-up procedure for the wireless access point;
receiving virtual private network tunnel parameters from the configuration server in response to the request, wherein the configuration server sends the virtual private network tunnel parameters to the wireless access point and to a centralized access gateway;
establishing a virtual private network tunnel between the wireless access point and the centralized access gateway via a public communications network during the power-up procedure for the wireless access point with the virtual private network tunnel parameters; and
authorizing at least one client coupled to the wireless access point to access resources via the virtual private network tunnel in response to authorization information, wherein the virtual private network tunnel is configured to allow simultaneous communications to and from the at least one client.

16. The method of claim 15, wherein the request includes an identifier of the wireless access point.

17. The method of claim 15, further comprising provisioning the centralized access gateway to receive authorization transmissions from a plurality of distributed access points.

18. The method of claim 15, wherein the centralized access gateway is selected based on at least one of a network speed and a network service load.

19. The method of claim 15, further comprising connecting an Ethernet card to the wireless access point to enable at least one wired device to communicate over the virtual private network tunnel.

20. A method of communicating with a plurality of remotely located access points, the method comprising:
receiving a request from a first remotely located access point at a configuration server during power-up of the first remotely located access point, wherein the request includes identification of the first remotely located access point;
determining, at the configuration server, that the first remotely located access point is to couple to a first centralized access control gateway of a plurality of centralized access control gateways based on the identification of the first remotely located access point;
enabling, via the configuration server, the first remotely located access point to establish a first virtual private network tunnel from the first remotely located access point to the first centralized access control gateway with first virtual private network tunneling parameters sent to the first remotely located access point by the configuration server, wherein the first virtual private network tunnel is configured to carry simultaneous communications to and from a first set of user devices coupled to the first remotely located access point;
receiving a second request from a second remotely located access point at the configuration server during power-up of the second remotely located access point;
determining, at the configuration server, that the second remotely located access point is to couple to the first centralized access control gateway based on the identification of the second remotely located access point; and
enabling, via the configuration server, the second remotely located access point to establish a second virtual private network tunnel from the second remotely located access point to the first centralized access control gateway with second virtual private tunneling parameters sent to the second remotely located access point by the configuration server, wherein the second virtual private network tunnel is configured to carry simultaneous communications to and from a second set of user devices coupled to the second remotely located access point.

21. The method of claim 20, wherein the request includes an identifier of the first remotely located access point, and wherein the configuration server determines that the first remotely located access point is to couple to the first centralized access control gateway when an identifier of the first centralized access control gateway is retrieved from a provisioning database based on the identifier of the first remotely located access point.

* * * * *